(No Model.)

L. J. PHELPS.
WHEEL TIRE.

No. 543,315.  Patented July 23, 1895.

WITNESSES:
A. D. Harrison
Rollin Abell

INVENTOR:
L. J. Phelps
by Wright Brown & Quimby
Attys.

UNITED STATES PATENT OFFICE.

LUCIUS J. PHELPS, OF BELMONT, MASSACHUSETTS.

WHEEL-TIRE.

SPECIFICATION forming part of Letters Patent No. 543,315, dated July 23, 1895.

Application filed February 5, 1895. Serial No. 537,411. (No model.)

*To all whom it may concern:*

Be it known that I, LUCIUS J. PHELPS, of Belmont, in the county of Middlesex and State of Massachusetts, have invented certain new and useful Improvements in Wheel-Tires, of which the following is a specification.

This invention is an improvement upon that shown in Letters Patent No. 466,577, granted to Frederick Schrader January 5, 1892, said patent showing a wheel rim or felly, a U-shaped tire, the edges of which are seated in the felly, a clamping-band located inside of the tire and pressing the edges thereof into the felly, and means for tightening said band, the arrangement being such that the band can be tightened or contracted to bind the edges of the tire firmly to the felly and expanded to permit the ready removal of the tire.

My invention relates to the construction of the band and to the means for adjusting the same, and has for its object to provide a strong and durable band and to provide simple, strong, and durable means for exerting a contracting force upon the band.

To this end my invention consists in the improvements which I will now proceed to describe and claim.

Figure 1:
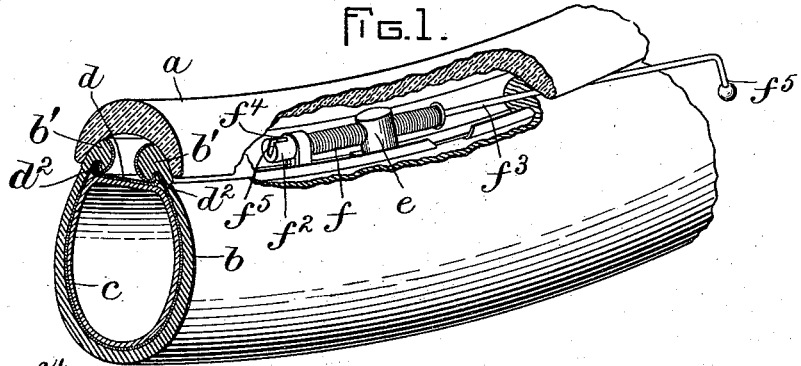
Figure 2:
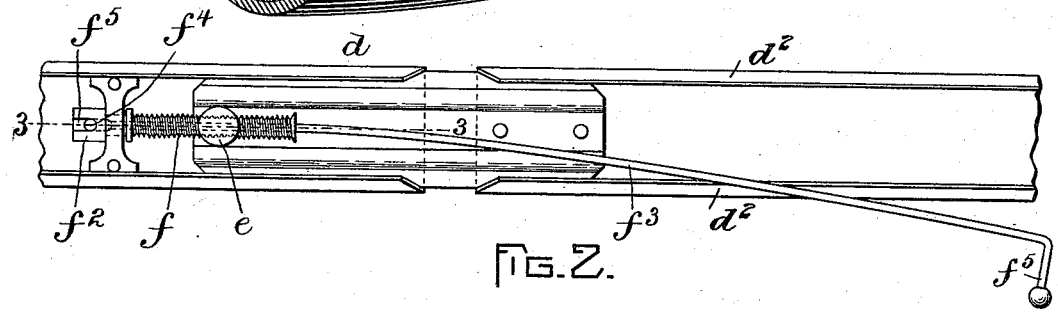
Figure 3:
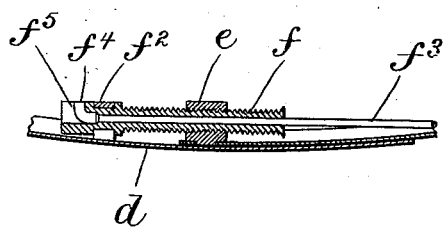
Figure 4:
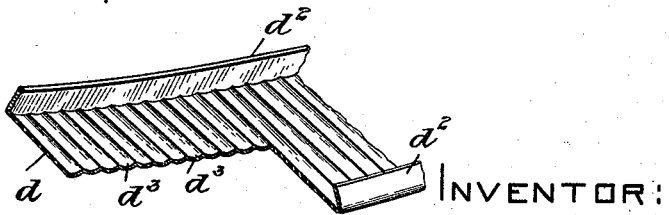

Of the accompanying drawings, forming a part of this specification, Figure 1 represents a combined perspective and sectional view of a portion of a wheel rim or felly and its tire provided with a tightening-band embodying my invention. Fig. 2 represents a plan view of a portion of the band, showing the improved means for adjusting the same. Fig. 3 represents a section on line 3 3 of Fig. 2. Fig. 4 represents a perspective view of a portion of the band.

The same letters of reference indicate the same parts in all the figures.

In the drawings, $a$ represents the rim or felly of a wheel, the same being of any suitable construction—such, for example, as may be found in pneumatic-tired bicycle and other vehicle-wheels. The rim here shown is of a pattern usually constructed of wood and is concave on its outer surface.

$b$ represents the tire, which is substantially U-shaped in cross-section—that is to say, it has free edges $b'\ b'$, which may be secured to the felly at points more or less widely separated. Said tire, when secured by the clamping-band hereinafter described, may constitute in itself a complete tire, but it is preferably used as a sheath or covering for the air-cushioned tube or inner tire $c$ usually employed in pneumatic tires.

$d$ represents the clamping-band, which is composed of a flexible metal strip, or, if desired, of two or more sections riveted together to form a strip of sufficient length to constitute a continuous circular band adapted to encircle the felly and compress the edges of the tire $b$ into the concave surface of the felly, substantially as shown in the Schrader patent above mentioned, the edges of the tire $b$ being thickened or provided with beads or welts and the band being formed to engage said beads or welts.

In carrying out my invention I provide improved means for adjusting the band, said means comprising a nut $e$, affixed to the band at or near one of its ends, a rotatable adjusting-screw $f$, journaled in a bearing or socket $f'$ affixed to the band at or near the opposite end thereof, said screw being formed to engage the nut $e$ and having at one end a head $f^2$, in which is formed a socket adapted to engage a screwdriver, and a flexible screw-operating rod $f^3$, permanently engaged with the screw and extending therefrom to the exterior of the wheel, where it may be grasped by the operator and rotated to rotate the screw and thus adjust the band. The operating-rod $f^3$ is preferably a length of slender and flexible wire, having one of its ends bent outwardly to form a lug or projection $f^4$, formed to engage a slot $f^5$ in the head $f^2$, as shown in Figs. 1 and 2, the rod being longitudinally movable, so that it may be pushed inwardly and thus disengaged from the screw-head and practically concealed between the felly and the tire and its outer end being at all times accessible, so that it may be grasped and drawn outwardly to engage the rod with the screw-head. The rod passes between one of the edges of the tire and the corresponding surface of the felly, the tire yielding sufficiently to accommodate the rod, the outer end of which is provided with a suitably-formed handle $f^5$, which, when the rod is pushed in, is nearly or quite concealed between the tire and felly, but is adapted to be grasped and pulled outwardly, as above stated. The adjusting-screw is tubular, the rod passing through it, as shown, and being freely movable endwise in it.

It will be seen that the nut, adjusting-screw, and operating-rod constitute a simple and convenient means for adjusting the clamping-band, said means being always accessible and ready for use without the employment of a separable device, such as a screwdriver.

The edges of the band are preferably provided with projecting flanges $d^2$ $d^2$, which are engaged with thickened beads or welts formed on the edges of the tire $b$, as shown in Fig. 1, the edges of the tire being thus held sufficiently far apart to accommodate the band-adjusting devices between them.

The band and its flanges so unite or lock together the edges of the tire that they cannot exert a lateral or spreading pressure on the felly—tending to split the latter longitudinally—as they would be liable to do if not thus locked together.

I prefer to provide the band with transverse corrugations $d^3$ between the flanges $d^2$, as shown in Fig. 4, said corrugations stiffening the band and preventing it from yielding or sinking under the pressure exerted on it by the tire.

It will be seen that the flexibility of the screw-operating rod enables the adjusting-screw and nut to extend substantially parallel or concentric with the parts of the band on which they are located, so that when the screw is rotated to contract the band the screw and nut exert a direct longitudinal pull on the band, the flexible rod transmitting power from a point outside of the circle of the band and its screw and nut without exerting any sidewise displacing pressure on the band, such as would be the case if the rod were engaged with the wheel-rim and subjected to longitudinal strain in adjusting the band, the band acting only to transmit motion to the screw.

I claim—

1. The combination with the wheel-rim and its U-shaped tire, of a contractible clamping-band engaged with the edge-portions of the tire and provided with a fixed nut, a nut-engaging adjusting screw having a socket, and a longitudinally movable flexible operating-rod or screw-driver extending from the screw to the exterior of the wheel.

2. A flexible clamping-band formed to engage the marginal portions of a tire and provided with a fixed nut, a tubular adjusting-screw engaged with said nut, and a flexible operating-rod longitudinally movable in said tubular screw and provided with a head formed to engage and rotate the screw.

3. The combination with the wheel rim or felly and its U shaped tire having marginal lips or beads of the clamping-band, having flanges engaged with said lips, and transverse corrugations between said flanges.

In testimony whereof I have signed my name to this specification, in the presence of two subscribing witnesses, this 30th day of January, A. D. 1895.

LUCIUS J. PHELPS.

Witnesses:
A. D. HARRISON,
ROLLIN ABELL.